(12) United States Patent
Sinharoy et al.

(10) Patent No.: US 11,758,101 B2
(45) Date of Patent: Sep. 12, 2023

(54) RESTORATION OF THE FOV OF IMAGES FOR STEREOSCOPIC RENDERING

(71) Applicant: Samsung Electronics Co., Ltd., Suwon-si (KR)

(72) Inventors: Indranil Sinharoy, Richardson, TX (US); Hossein Najaf-Zadeh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/408,237

(22) Filed: Aug. 20, 2021

(65) Prior Publication Data

US 2022/0070426 A1 Mar. 3, 2022

Related U.S. Application Data

(60) Provisional application No. 63/070,053, filed on Aug. 25, 2020.

(51) Int. Cl.
| | |
|---|---|
| *H04N 13/111* | (2018.01) |
| *G06T 7/593* | (2017.01) |
| *H04N 13/128* | (2018.01) |
| *G06T 7/285* | (2017.01) |
| *H04N 13/161* | (2018.01) |
| *H04N 13/133* | (2018.01) |

(52) U.S. Cl.
CPC .......... *H04N 13/111* (2018.05); *G06T 7/285* (2017.01); *G06T 7/593* (2017.01); *H04N 13/128* (2018.05); *H04N 13/161* (2018.05); *G06T 2200/04* (2013.01); *G06T 2207/10021* (2013.01); *H04N 13/133* (2018.05)

(58) Field of Classification Search
CPC .. H04N 13/111; H04N 13/128; H04N 13/161; G06T 7/285; G06T 7/593
See application file for complete search history.

(56) References Cited

U.S. PATENT DOCUMENTS

| | | | |
|---|---|---|---|
| 8,988,502 B2 | 3/2015 | Gaddy et al. | |
| 9,811,946 B1 * | 11/2017 | Hung | .......... G06T 3/4038 |
| 10,165,258 B2 * | 12/2018 | Cabral | ............ G06T 7/246 |
| 10,645,370 B2 | 5/2020 | Chernobieff et al. | |
| (Continued) | | | |

FOREIGN PATENT DOCUMENTS

WO 2019106093 A1 6/2019

OTHER PUBLICATIONS

International Search Report and Written Opinion of the International Searching Authority in connection with International Application No. PCT/KR2021/011390 dated Nov. 22, 2021, 9 pages.

*Primary Examiner* — Rowina J Cattungal

(57) ABSTRACT

An apparatus includes a memory and a processor. The memory receives a plurality of frames of a scene captured from a camera array. The processor selects a first frame and a second frame from the plurality of frames. The processor also rectifies and aligns the first frame and the second frame to a reference frame, where a blank region of the second frame has a greater area than a blank region of the first frame. The processor further transforms the first frame to have near-optimal superposition to the second frame. The processor inserts a patch from the transformed first frame into the blank region of the second frame.

20 Claims, 15 Drawing Sheets

(56) References Cited

U.S. PATENT DOCUMENTS

| | | | |
|---|---|---|---|
| 10,979,693 B2 | 4/2021 | Jin et al. | |
| 2011/0157305 A1* | 6/2011 | Kosakai | G06T 11/60 |
| | | | 348/43 |
| 2013/0044108 A1* | 2/2013 | Tanaka | H04N 13/111 |
| | | | 345/419 |
| 2014/0293007 A1 | 10/2014 | Angot et al. | |
| 2018/0182175 A1 | 6/2018 | Cabral et al. | |
| 2019/0035055 A1 | 1/2019 | Yu et al. | |
| 2019/0297238 A1 | 9/2019 | Klosterman | |
| 2020/0027263 A1 | 1/2020 | Holzer et al. | |
| 2020/0233213 A1 | 7/2020 | Porter et al. | |
| 2020/0380778 A1 | 12/2020 | Pomerantz et al. | |

* cited by examiner

RESTORATION OF THE FOV OF IMAGES FOR STEREOSCOPIC RENDERING

CROSS-REFERENCE TO RELATED APPLICATION AND PRIORITY CLAIM

This application claims priority under 35 U.S.C. § 119(e) to U.S. Provisional Patent Application No. 63/070,053 filed on Aug. 25, 2020, which is hereby incorporated by reference in its entirety.

TECHNICAL FIELD

This disclosure relates generally to image processing devices and processes. More specifically, this disclosure relates to methods and apparatuses for restoring the field of view (FOV) of images for stereoscopic rendering captured via multiview camera rig setups.

BACKGROUND

One-dimensional (1D) or two-dimensional (2D) parallel camera arrays are a common way of capturing multi-view and lightfield videos. The captured frames require transformation to make them viewable in three dimensional (3D) autostereoscopic displays. However, the transformation of images or videos can result in a signification loss in the usable FOV of the multi-view video or light field content. Such a loss of FOV causes the content to be undesirable. The techniques described in this disclosure aim to restore the usable FOV of the images or videos captured using parallel camera array setups.

SUMMARY

This disclosure provides methods and apparatuses for restoring the FOV of images for stereoscopic rendering captured via parallel camera setups.

In a first embodiment, an apparatus includes at least one memory and at least one processor operably coupled to the memory. The at least one memory is configured to receive a plurality of frames of a scene captured from a camera array. The at least one processor is configured to select a first frame and a second frame from the plurality of frames. The at least one processor is further configured to rectify and align the first frame and the second frame to a reference frame, wherein a blank region of the second frame has a greater area than a blank region of the first frame. The at least one processor is also configured to transform the first frame to have near-optimal superposition to the second frame in the overlapping regions of the FOVs. In a perfect superposition, every point (feature point at any depth) from the first frame will have the same pixel coordinates as the corresponding point in the second frame. However, since the two frames belong to cameras that are physically separated, we may not find a 2D-to-2D transformation of the first frame such that the transformed first frame can perfectly superpose on the second frame. Therefore, we find a near-optimal superposition between the two frames such that all feature points that originate from a plane at certain depth in the scene (most commonly, the depth-plane corresponding to the plane of convergence) in the transformed first frame superpose with the corresponding feature points in the second frame. In addition, the at least one processor is configured to insert a patch from the transformed first frame into the blank region of the second frame.

In a second embodiment, a method includes receiving a plurality of frames of a scene captured from a camera array; and selecting a first frame and a second frame from the plurality of frames. The method further includes rectifying and aligning the first frame and the second frame to a reference frame, wherein a blank region of the second frame has a greater area than a blank region of the first frame. The method also includes transforming the first frame to have near-optimal superposition to the second frame. In addition, the method includes inserting a patch from the transformed first frame into the blank region of the second frame.

In a third embodiment, a non-transitory machine readable medium stores instructions that when executed cause a processor to receive a plurality of frames of a scene captured from a camera array; and select a first frame and a second frame from the plurality of frames. The instructions that when executed further cause a processor to rectify and align the first frame and the second frame to a reference frame, wherein a blank region of the second frame has a greater area than a blank region of the first frame. The instructions that when executed also cause a processor to transform the first frame to have near-optimal superposition to the second frame. In addition, the instructions that when executed cause a processor to insert a patch from the transformed first frame into the blank region of the second frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Figure 1:
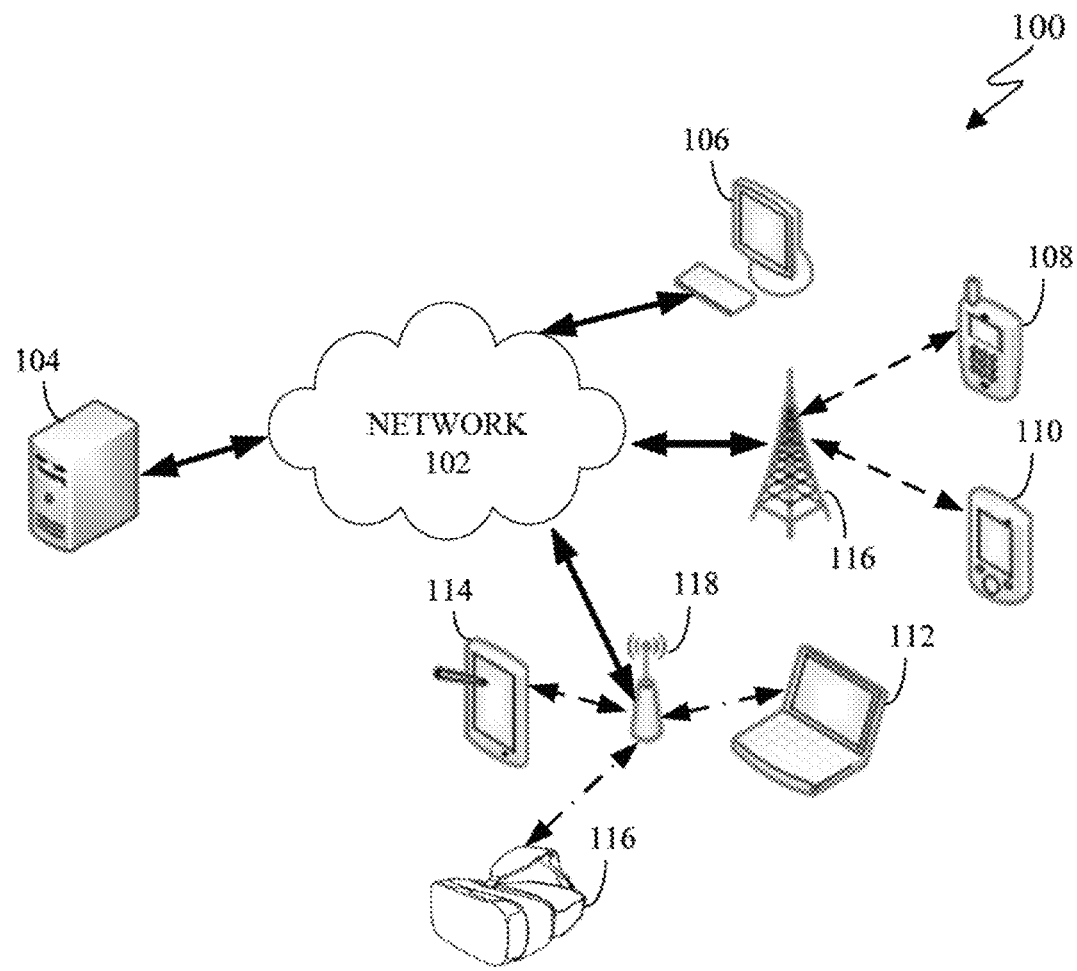
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, including one or more FOV restored frames captured from a linear camera array, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. a 3D display can display a stereoscopic image including one or more stereoscopic rendered images. In certain embodiments, any of the client devices 106-116 can include an encoder, decoder, or both. For example, the mobile device 108 can receive a plurality of frames from a linear camera array and then stereoscopic render the plurality of frames to be transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to rectify and align the plurality of frames, transform each frame to an adjacent frame, insert a patch from the transformed frame into the adjacent frame and transmit the bitstream including the restored plurality of frames to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116.

For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a stereoscopic frame, compress the stereoscopic frame, transmit the stereoscopic frame, receive the stereoscopic frame, render the stereoscopic frame, or a combination thereof. For example, the server 104 can then compress stereoscopic frame to generate a bitstream and then transmit the bitstream to one or more of the client devices 106-116. For another example, one of the client devices 106-116 can compress a stereoscopic frame to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
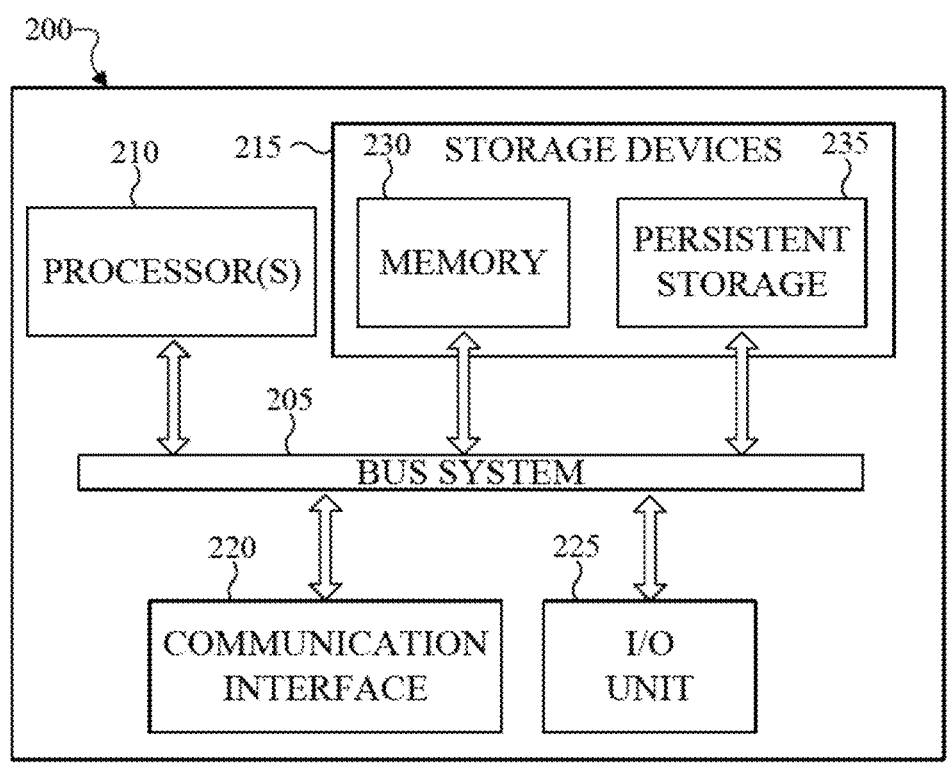
FIGS. 2 and 3 illustrate example electronic devices in accordance with an embodiment of this disclosure.
Figure 3:
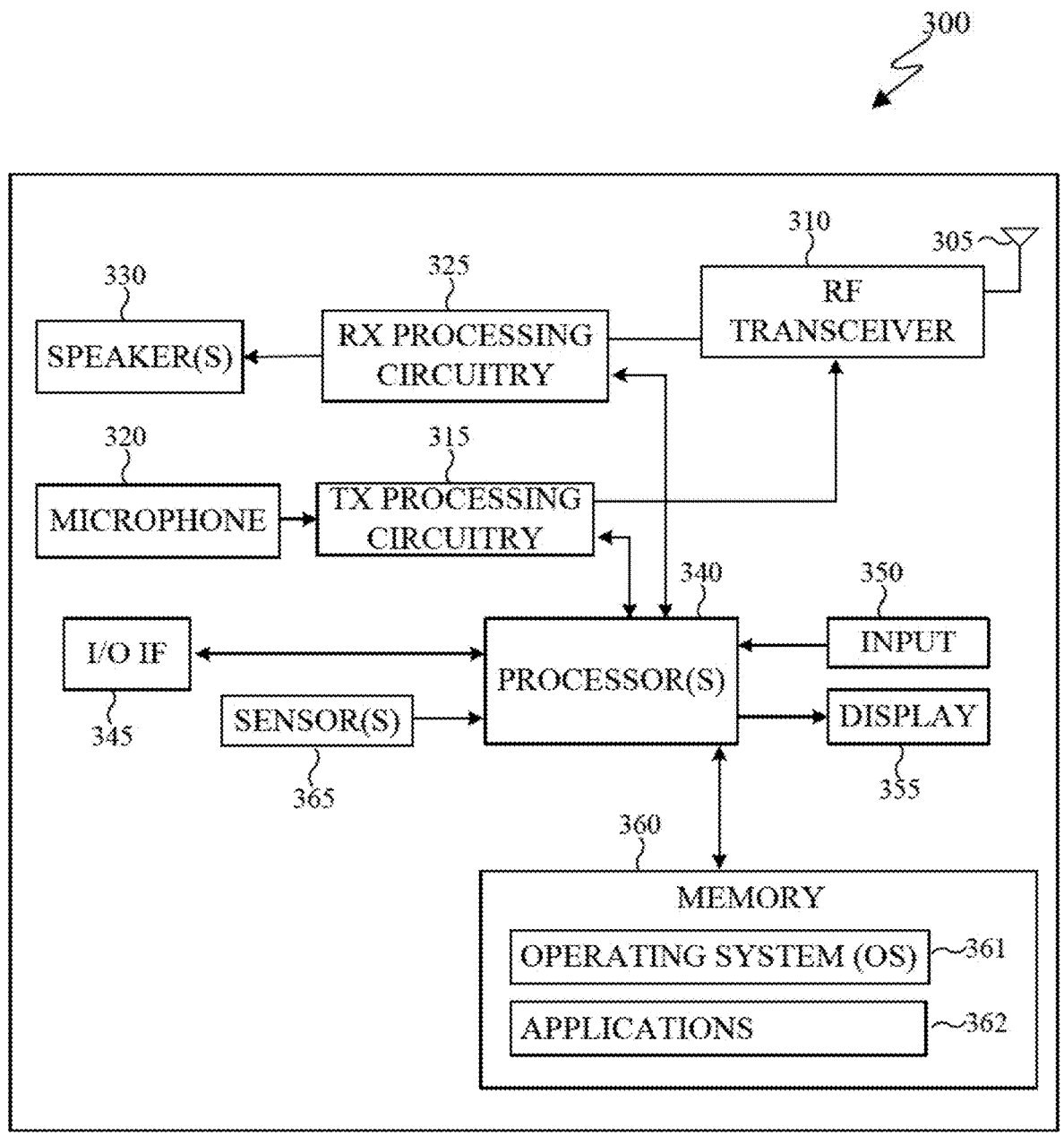

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a stereoscopic frame stored within the storage devices 215. In certain embodiments, encoding a stereoscopic frame also decodes the stereoscopic frame to ensure that when the stereoscopic frame is reconstructed, the stereoscopic frame matches the stereoscopic frame prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for receiving a plurality of frames of a scene captured from a linear camera array; instructions for selecting a first frame and a second frame from the plurality of frames, instructions for rectifying and aligning the first frame and the second frame to a reference frame, wherein a blank region of the second frame has a greater area than a blank region of the first frame; transforming the first frame to have near-optimal superposition to the second frame; and inserting a patch from the transformed first frame into the blank region of the second frame. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a stereoscopic frame to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a stereoscopic frame.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, stereoscopic frame, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
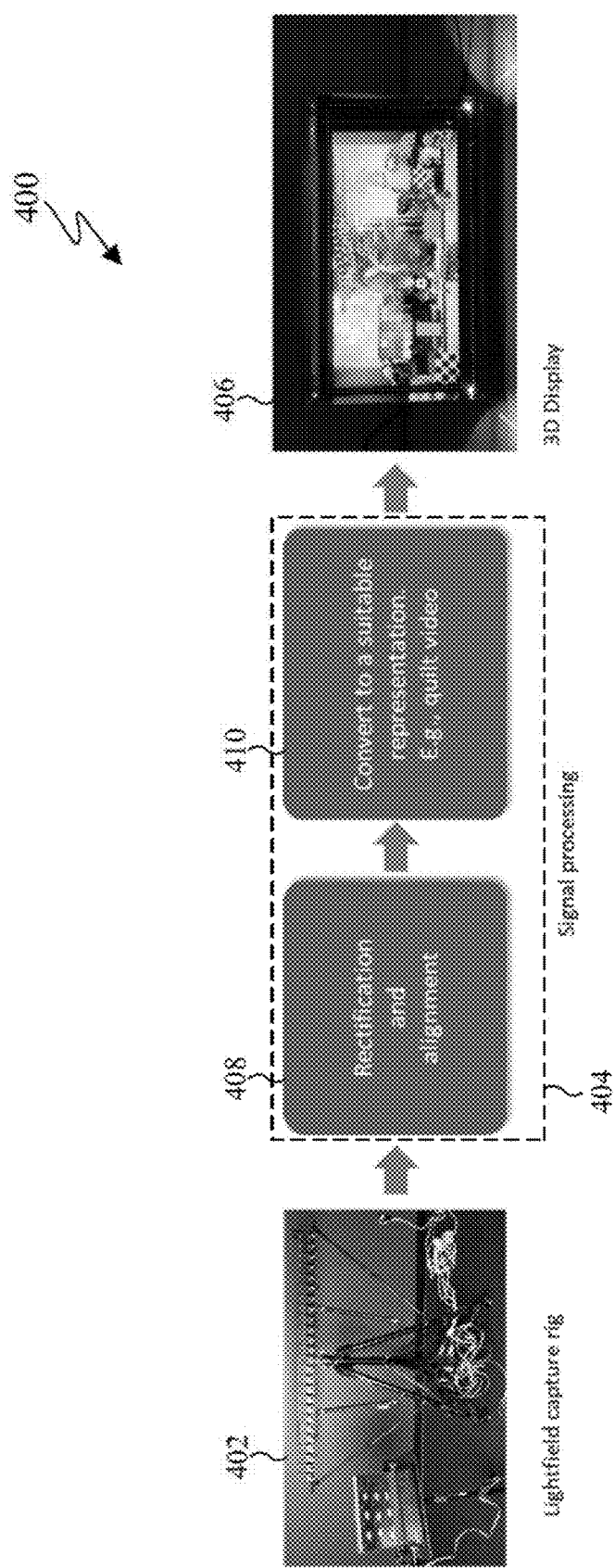
FIG. 4 illustrates an example end-to-end pipeline for a stereoscopic rendering system using a camera array and display in accordance with this disclosure.

FIG. 4 illustrates an example end-to-end pipeline for a stereoscopic rendering system 400 using a camera array and display in accordance with this disclosure. The embodiment of the stereoscopic rendering system 400 illustrated in FIG. 4 is for illustration only. FIG. 4 does not limit the scope of this disclosure to any particular implementation of an electronic device(s).

As shown in FIG. 4, the stereoscopic rendering of image array 600 can be performed using a linear multi-camera array 402, a stereoscopic rendering processor 404, and a display 406. The camera array 402, stereoscopic rendering processor 404, and the display 406 can respectively correspond to the sensors 365 for imaging, processor(s) 340, and the display 355 of the electronic device 300 shown in FIG. 3.

The camera array 402 can be formed of an array of imaging sensors. The orientation of the imaging sensors can be adjusted to align an FOV for individual imaging sensors to a projection plane. In certain embodiments, the orientation of the imaging sensors can be fixed to a projection plane of a specified distance. The imaging sensors can be linearly aligned and evenly spaced apart. In certain embodiments, the imaging sensors can be unevenly spaced based on a distance from a center image sensor or center of the camera array 402. The imaging sensors can simultaneously capture image frames or video frames.

The stereoscopic rendering processor 404 can process the captured image or video frames into a stereoscopic frame(s) for outputting on the display 406. The stereoscopic rendering processor 404 can include a rectification and alignment (RA) processor 408 and a conversion processor 410. The RA processor 408 can apply geometric transformations to each frame from the camera array 402 to create a "plane of convergence" or zero-disparity plane at a specific depth in the captured scene. Pixels in the frame corresponding to the plane of convergence have a zero value, pixels in the frame in front of the plane of convergence have negative values, and pixels in the frame behind the plane of convergence have a positive value. This type of rectification and alignment provides frame(s) that can be properly displayed on the display 406. Any loss of FOV is an undesirable side-effect of this geometric transformation. The conversion processor 410 can convert the rectified and aligned frames to a suitable representation, such as a quilt video, for displaying.

The display 406 can display the processed frame(s) from the stereoscopic rendering processor 404. The display 406 can be a 3D display, such as a looking glass display. The display 406 allows the different frame(s) from each of the individual imaging sensors to be viewed from angles on the display 406.

Although FIG. 4 illustrates a stereoscopic rendering system 400, various changes may be made to FIG. 4. For example, the sizes, shapes, and dimensions of the individual components in the stereoscopic rendering system 400 can vary as needed or desired. Also, the number and placement of various components described in the stereoscopic rendering system 400 can vary as needed or desired. Furthermore, while described as a series of steps, various steps in stereoscopic rendering system 400 may overlap, occur in parallel, or occur any number of times. In addition, the stereoscopic rendering system 400 may be used in any other suitable imaging process and is not limited to the specific processes described above.

Figure 5B:
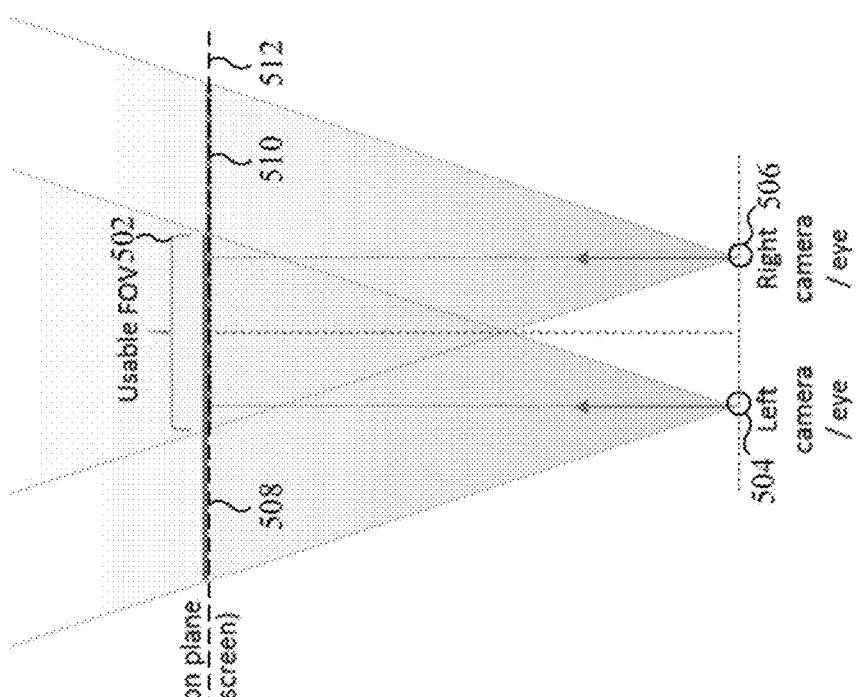
FIGS. 5A and 5B illustrate example usable FOVs from a first camera and a second camera in accordance with this disclosure.
Figure 5A:
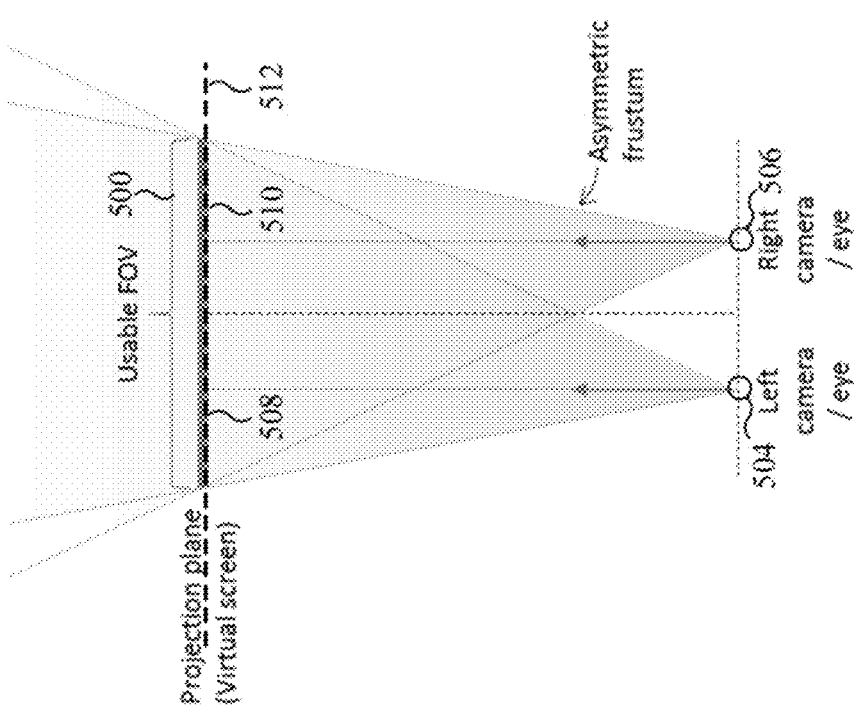

FIGS. 5A and 5B illustrate example usable FOVs 500, 502 from a first camera 504 and a second camera 506 in accordance with this disclosure. In particular, FIG. 5A illustrates converging usable FOVs 500 and FIG. 5B illustrates non-converging usable FOVs 502. The embodiments of the usable FOVs 500, 502 illustrated in FIGS. 5A and 5B are for illustration only. FIGS. 5A and 5B do not limit the scope of this disclosure to any particular implementation of a camera array.

As shown in FIGS. 5A and 5B, stereoscopic and autostereoscopic rendering systems often employ an off-axis convergence mode in which the stereo camera pair, such as first camera 504 and second camera 506, or the multiple cameras of the stereoscopic rendering system 400 are shifted inwards so that the first FOV 508 corresponding to the first camera 504 and the second FOV 510 corresponding to the second camera 506 converge as the converging usable FOV 500 at a projection plane 512, as shown in FIG. 5A. The off-axis convergence mode is also known as the "parallel axis asymmetric frustum perspective projection". Parallel axis asymmetric frustum perspective projection mode is an ideal way of creating stereo pairs due to the closeness to how the human vision works. The off-axis convergence mode produces the converging usable FOVs 500. The converging usable FOVs 500 represents a maximum amount of FOVs at a projection plane 512 from the first FOV 508 and the second FOV 510.

In contrast, several stereo and multi-camera capturing rigs mount physical cameras, whose sensors cannot be shifted, such that an optical axis of the first camera 504 and an optical axis of the second camera 506 are parallel and result in non-converging usable FOVs 502 at the projection plane 512, as shown in FIG. 4B. These stereo image frames or video frames may not be directly used for viewing through autostereoscopic rendering systems, and therefore a translation and/or shearing transformation can be applied to the images. However, these techniques lead to significant cropping of the first FOV 508 and/or the second FOV 510.

Although FIGS. 5A and 5B illustrate a usable FOVs 500, 502, various changes may be made to FIGS. 5A and 5B. For example, the sizes, shapes, and dimensions of the usable FOVs 500, 502 and corresponding components of FIGS. 5A and 5B can vary as needed or desired. Also, the number and placement of various components used in operation of the usable FOVs 500, 502 can vary as needed or desired. In addition, the usable FOVs 500, 502 may be used in any other suitable imaging process and is not limited to the specific processes described above.

Figure 6A:
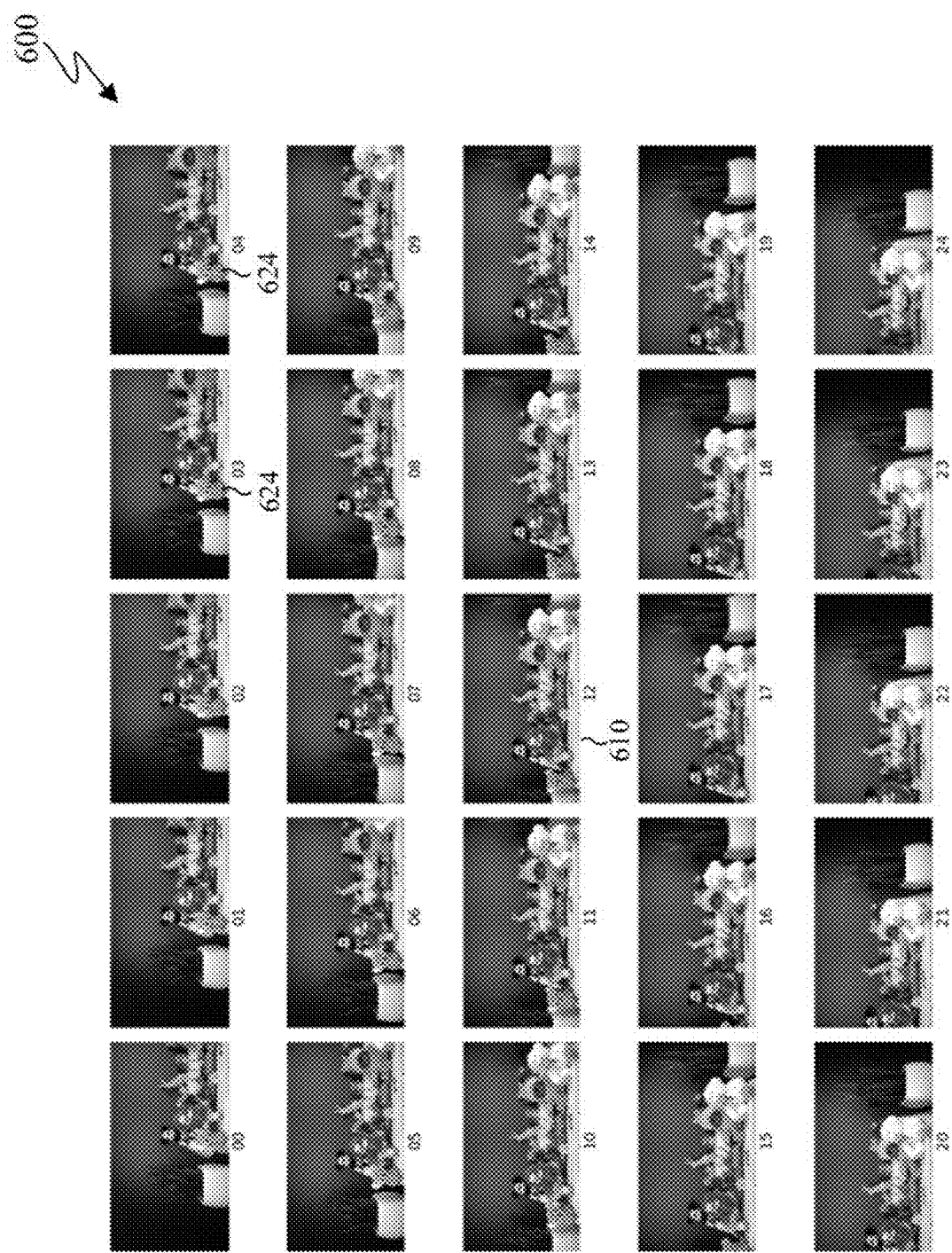
FIGS. 6A through 6F illustrate an example FOV restoration of an image array in accordance with this disclosure.
Figure 6B:
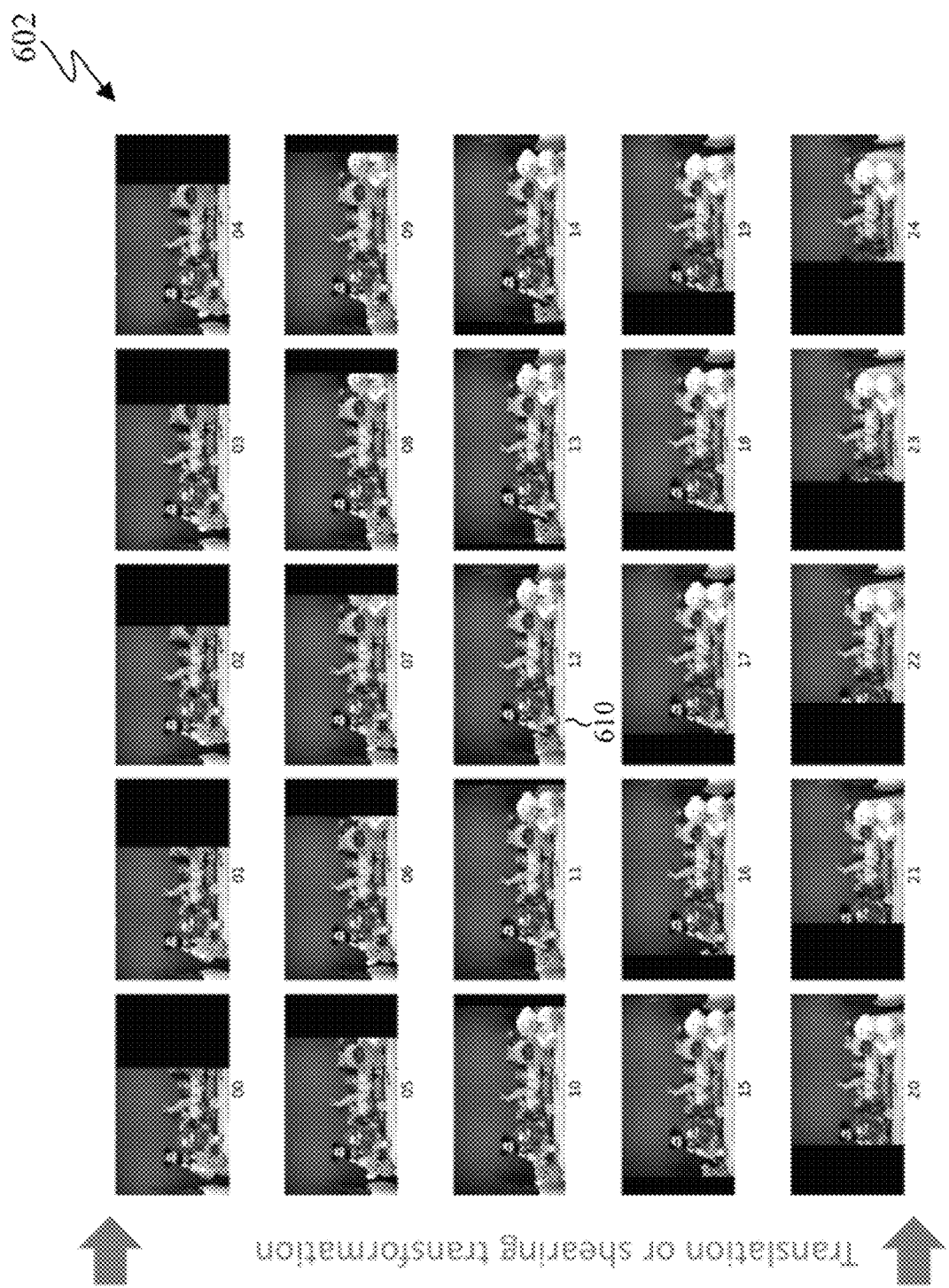
Figure 6C:
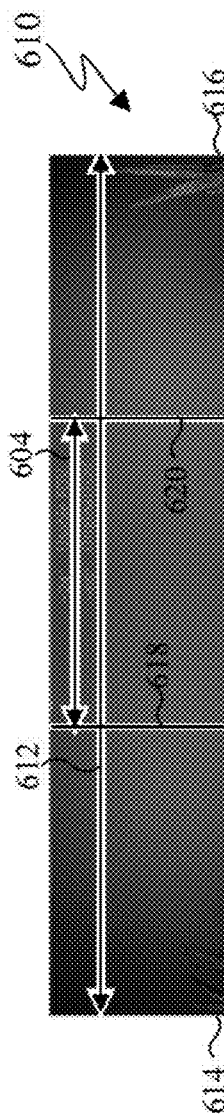
Figure 6D:
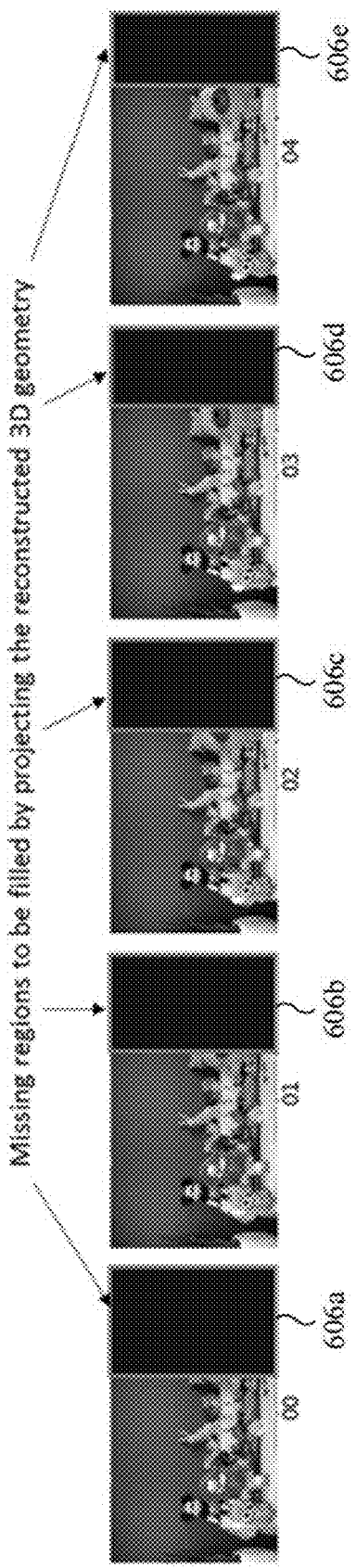
Figure 6E:
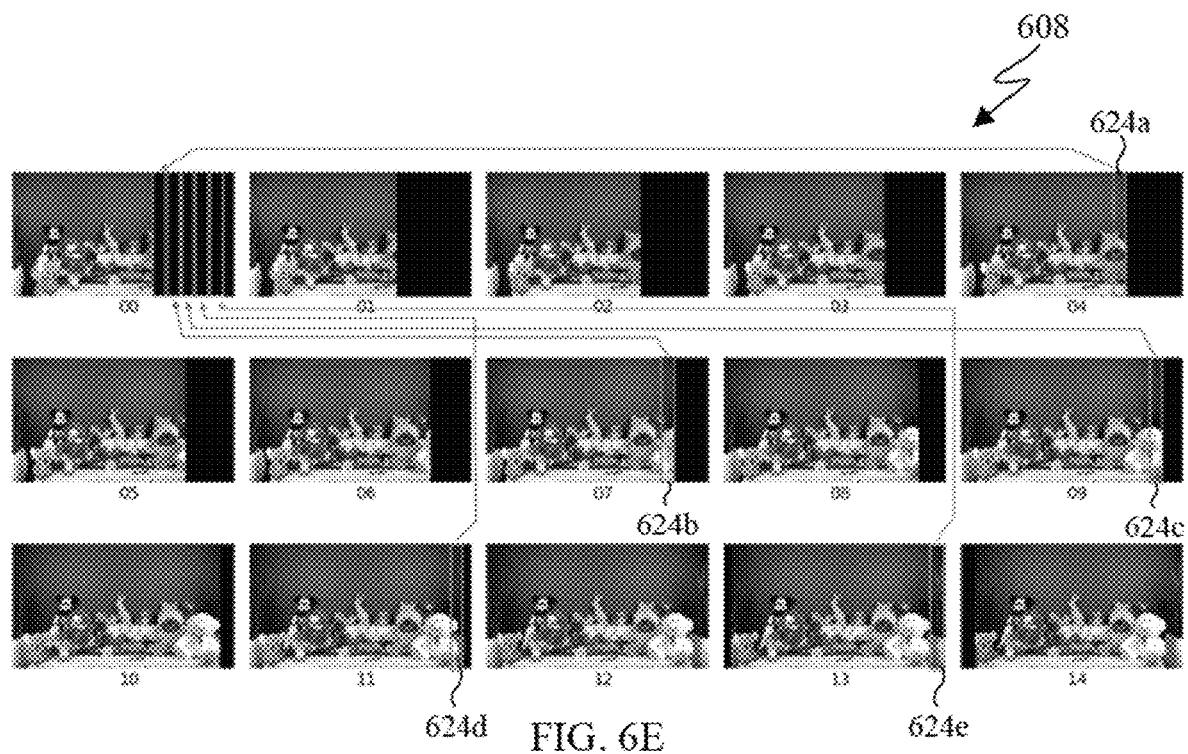
Figure 6F:
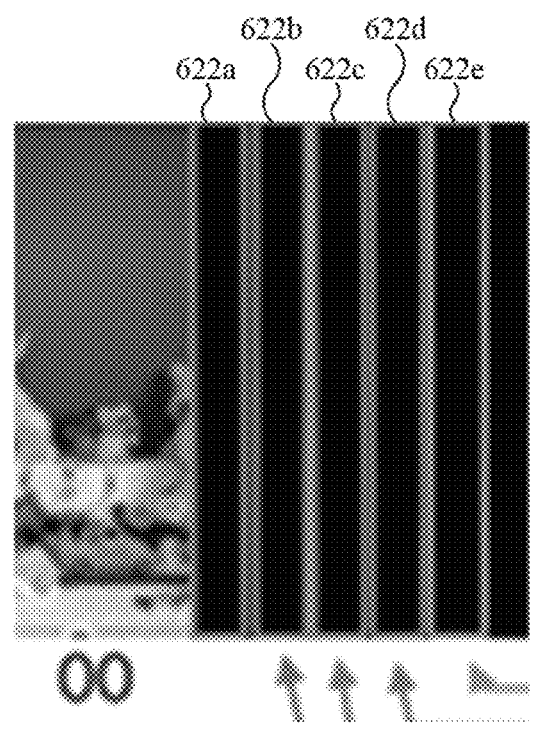

FIGS. 6A through 6F illustrate an example FOV restoration of an image array 600 in accordance with this disclosure. In particular, FIG. 6A illustrates an image array 600, FIG. 6B illustrates a transformed image array 602, FIG. 6C illustrates a usable FOV 604 for the transformed image array 602, FIG. 6D illustrates blank regions 606 from the transformed image array 602, FIG. 6E illustrates a hierarchical restoration 608 of the transformed image array 600, and FIG. 6F illustrates an enlarged first transformed frame 00. The embodiments illustrated in FIGS. 6A through 6F are for illustration only. FIGS. 6A through 6F do not limit the scope of this disclosure to any particular implementation of an electronic device.

As shown in FIG. 6A, a set of video frames was captured from a 1-dimensional (1D) 25×1 linear camera array in which, identical cameras were arranged along a horizontal axis. Frames 00-24 of image array 600 were captured by the camera array 402 set up in a linear rig with a parallel camera setup. An original FOV in each frame, which corresponds to the FOV of a camera or optical sensor, can be approximately 66°. The first frame 00 corresponds to an imaging sensor at a first end of the linear camera array 402 and frame 24 corresponds to an imaging sensor at a second end of the linear camera array 402 that is opposite to the first end. The scene depicted in the image array 600 in a table against a wall, the table is covered with stuffed toys and has a potted plant on each side. The first frame 00 captures the furthest point to the left of the scene and the 25th frame 24 captures the furthest point to the right of the scene. The reference frame 610 corresponds to the 13th frame 12 in the illustrated embodiment. Typically, the reference frame 610 for FOV restoration utilizes a frame captured from a camera towards a center of the camera array 402. However, this is not limiting and any frame in the image array 600 can be selected as a default or reference frame. The reference frame 610 in the illustrated embodiment depicts the entire table and all of the stuffed toys along with a portion of each potted plant on alternate sides of the table.

As shown in FIG. 6B, the induced translation and/or shearing of the image frames 00-24 or video frames captured using a multi-camera setup with parallel optical axes wastes a large portion of the FOV. The corresponding frames following a translation transformation required for FOV restoration. Cropping along the horizontal direction in each frame 00-24, except for the reference frame 610 (frame 12) is clearly visible. Moreover, an amount of cropping in an image is proportional to a distance of a corresponding camera from a center camera in the camera array 402. This cropping results in the reduction of the actual or usable FOV of the rendered stereoscopic content. For the illustrative example presented herein, the usable FOV is reduced from 66° to about 24°, shown in FIG. 6C. FOV restoration aims to restore FOV lost due to the shifting and/or shearing transformation applied to the image frames and/or video frames obtained from physical parallel arrangement of cameras in a multi-camera array 402 for rendering in autostereoscopic displays, such as display 406.

As shown in FIG. 6C, the FOV 612 is based on an area of the scene in the reference frame 610 in the camera array 402. The FOV 612 includes, from the left FOV boundary 614 to right FOV boundary 616 of the reference frame 610, a portion of the potted plant, many stuffed toys on a table, and a portion of another potted plant. The usable FOV 604 is determined based on the area of the scene that is viewed from every camera. In other words, the left usable FOV boundary 618 of the usable FOV 604 is based on the imaging sensor of the camera located furthest on the right side of the camera array 402. The right usable FOV boundary 620 of the usable FOV 604 is based on the imaging sensor on the camera located furthest on the left side of the camera array 402. As an illustrative example, FIG. 6D shows blank regions 606 that correspond to the area of the area of the reference frame 610 that the respective frames did not capture. For example, the frame 00, which corresponds to the camera located furthest to the left in the camera array 402, captures the scene to the left of the reference frame 610, shown in FIG. 6A. The first blank region 606a corresponds to an area of the reference frame 610 that was not captured in the first frame 00. Similarly, the second blank region 606b, third blank region 606c, fourth blank region 606d, and the fifth blank region 606e, respectively correspond to area of the reference frame 610 that was not capture in the second frame 01, the third frame 02, the fourth frame 03, and the fifth frame 04. The first blank region 606a determines the right usable FOV boundary 620 and the twenty-fifth blank region determines the left usable FOV boundary 618.

As shown in FIGS. 6E and 6F, a hierarchical restoration 608 can be used to fill in the blank regions 606 of each frame in the transformed image array 602. As an illustrative example, FIG. 6E illustrates a process for filling in a first blank region 606a of a first frame 00 and FIG. 6F illustrates a magnified blank region 606 for convenience of description. Because each frame further in the sequence from the first frame 00 has an increasingly greater difference in orientation and difference, filling in the blank region 606 using patches from frames capture by cameras further away from the first camera is more noticeable. However, the frames from cameras closer to the first camera also have blank regions 606. In certain embodiments, the difference between the first blank region 606a in the first frame 00 and the second blank region 606b in the second frame 01 can be determined as a blank portion 622 of the blank region 606 of the first frame 01 and the patch in the area of frame 01.

In certain embodiments, the blank portions 622 and patches 624 can be determined based on different criteria. For instance, the blank portions 622 and patches 624 can be determined based on an equally divided area of the blank region 606 for each of the blank portions 622. In this instance, a frame for a corresponding patch would be determined based on a difference, between the blank region 606a of the first frame 00 and another frame, that exceeds the equally divided blank portion size. In another example, a size of the blank portion 622 can be determined based on skipping a specific number of frames for a patch 624. The number of frames could be the same, such as two frames, or different, such as illustrated in FIG. 6E. After the first blank portion 622a is determined, a corresponding first blank patch 624a is determined. In the illustrative example, the first blank patch 624a is copied from the fifth frame 04 and inserted into the first blank portion 622a. A second blank patch 624b is copied from the eighth frame 07 and inserted into a second blank portion 622b. A third blank patch 624c is copied from the tenth frame 09 and inserted into a third blank portion 622c. A fourth blank patch 624d is copied from the twelfth frame 11 and inserted into a fourth blank portion 622d. A fifth blank patch 624e is copied from the fourteenth frame 13 and inserted into the fifth blank portion 622e. If the final patch exceeds the final blank portion, a partial blank patch can be used or the remaining blank portion can be filled in with a corresponding portion of the reference frame 610.

In certain embodiments, the frames can include feature points 624 at a plane of convergence. The feature points 624 can be used to identify a translation between frames. The translation of the feature point 624 can be used to identify dimensions of a blank region 606. For example, the koala can be located at the plane of convergence for the frame shown in FIG. 6A. Therefore, the lateral translation of the koala is shown moving between frame 03 and frame 04. The lateral translation of the koala could be used to determine a blank region of frame 03 if the frame 04 was used as a first frame or a reference frame.

In certain embodiments, the features points are identified in the first frame and the corresponding feature points are identified in the second frame. Then, a geometric transformation matrix (such as a homography) is estimated between the frames using the feature points. The dimensions of the blank region can be determined from the translation components of the geometric transformation matrix.

In certain embodiments, a dense 3D scene geometry is first reconstructed using Structure from Motion (SfM) and Multi-View Stereo (MVS). If the camera intrinsic and extrinsic parameters are known (e.g., via camera calibration), the parameters are used during the 3D reconstruction. Otherwise, the positions and the orientations of the multiple cameras may be determined from un-calibrated and/or unstructured 3D reconstruction techniques, for example, the parameters used in COLMAP. The reconstructed scene geometry may be represented using point clouds, meshes, or a hybrid of both point clouds and meshes depending on the optimal representation of the local geometry in the scene. A virtual perspective camera with an appropriately wide FOV or an asymmetric view frustum is used to generate the patch corresponding to blank region 606 in each image by projecting (re-imaging) the reconstructed 3D geometry from the same position and orientation as the real cameras corresponding to each image in the sequence. Furthermore, image in-painting techniques may be used to fill any occlusion holes in the projected image patches. Finally, the image patches are augmented to each of the translated and/or sheared images to fill the blank regions 606 of the FOV 612.

In certain embodiments, set of complete images, instead of only the blank regions 606, from different viewpoints may be generated by re-imaging the reconstructed 3D geometry with a virtual camera array. In certain embodiments, the virtual cameras have a larger FOV than the original physical cameras but employ the same type of parallel-axis configuration as the original physical cameras. The FOV of the virtual cameras are determined based on the FOV of the physical cameras, the required FOV or the FOV of the autostereoscopic display, and the depth of the projection plane. The newly generated images (with a larger FOV) undergo the same type of translation and/or shearing transformation required for autostereoscopic viewing.

In certain embodiments, while generating the set of complete images, the virtual cameras may employ a virtual sensor shift or an asymmetric frustum. The amount of sensor shifts or the degree of asymmetry of the frustum of a particular virtual camera in the virtual camera array is a function of (and increases as) the distance of a virtual camera from the center or a reference camera. Due to the sensor shift or asymmetric frustum, the generated images can be directly viewed through an autostereoscopic display.

In certain embodiments, the blank regions 606 in each of the translated and/or sheared images may be synthesized using deep-learning based view synthesis techniques specialized for view extrapolation. However, instead of directly using a network that is pre-trained for view-extrapolation, a slightly modified architecture is used to enable the network to leverage the scene information from other images in the sequence.

In another embodiment, an incremental and iterative novel view extrapolation can be used in which new views are synthesized from a set of real images and previously synthesized views, thereby incrementally increasing FOV overlap within the set of camera images. Like the previously discussed method, the view extrapolation algorithm need not be completely blind, instead, it can use information from the other images in the set.

The generated patches in the aforementioned techniques may exhibit slightly different image characteristics (such as color variations, size variations, etc.). Therefore, filtering may be applied at the borders to seamlessly unite the original images with the synthesized blank regions 606.

In another embodiment, the original images (before the translation and/or shear transformation) are used to form a layered depth representation of scene such as multi plane image (MPI). The layer depth images may be obtained via a deep learning network like the Local Light Field Fusion used for novel view synthesis. Novel views of a scene can be reconstructed from MPI-like representations of the scene by combining parts of the layered depths depending upon the position and orientation of the virtual camera. Therefore, MPI based view synthesis techniques can be used in conjunction with the above-mentioned technique of geometric re-projection to restore the missing regions of the FOV in each of the translated and/or sheared images.

In yet another embodiment, the rotation of a few cameras in the physical camera array 402 may be intentionally perturbed to produce various degrees of toe-in configurations to increase the FOV overlap between several sub-sets of cameras in the camera array 402. The degree of rotation may depend upon the scene geometry and the distance of the scene from the camera array 402. As the cameras with converging optical axes will have significant overlap in the FOV, the loss of FOV can be minimized during the translation and/or shearing transformation. In another embodiment, this technique of toed-in cameras can be combined with the aforementioned approaches discussed in this disclosure for restoring the FOV.

Although FIGS. 6A through 6F illustrate an FOV restoration of an image array 600, various changes may be made to FIGS. 6A through 6F. For example, the sizes, shapes, and dimensions of the image array 600 and its individual components can vary as needed or desired. Also, the number and arrangement of various images of the image array 600 can vary as needed or desired. In addition, the image array 600 may be used in any other suitable imaging process and is not limited to the specific processes described above.

Figure 7A:
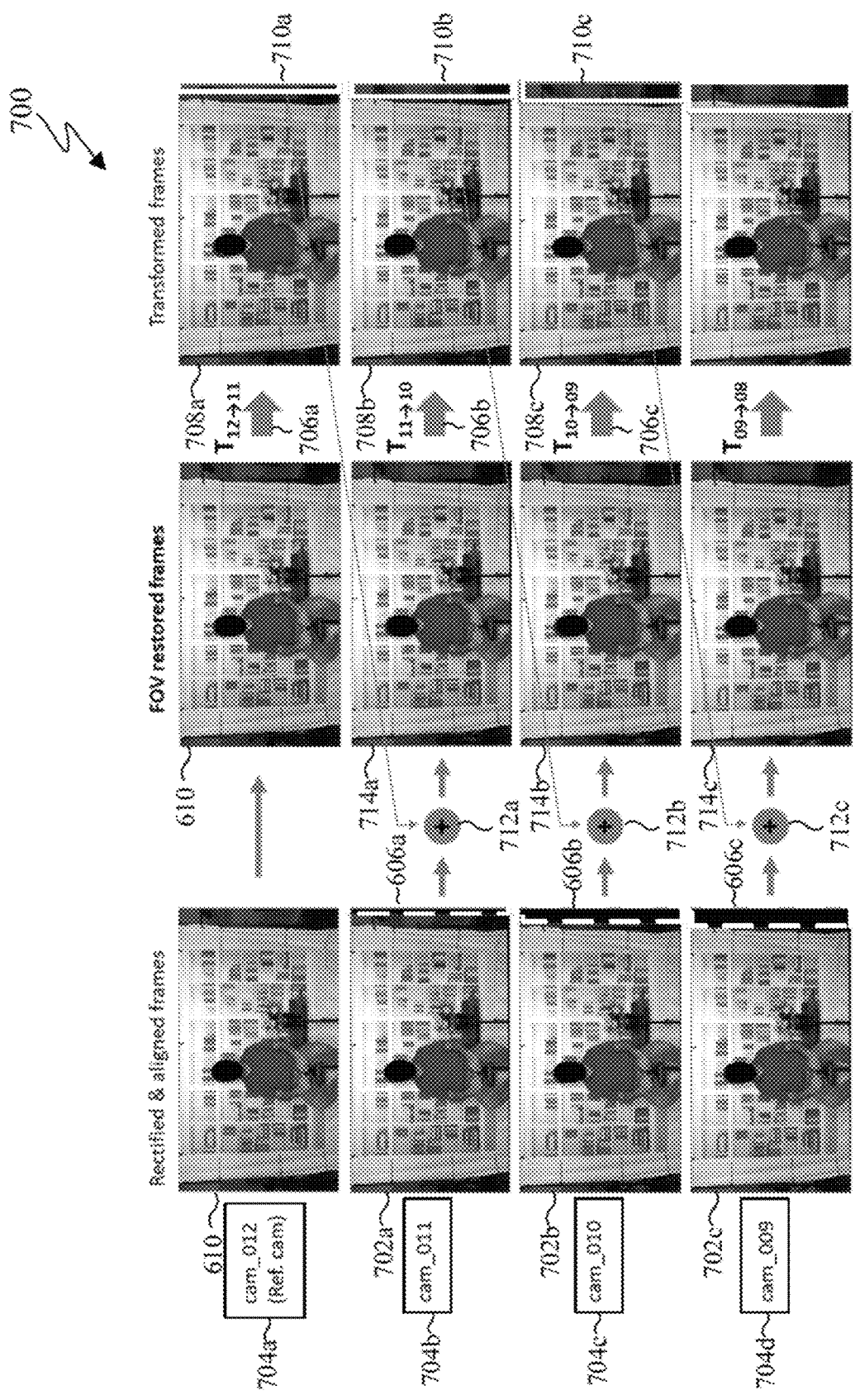
FIGS. 7A through 7D illustrate an example hierarchical FOV restoration in accordance with this disclosure.
Figure 7B:
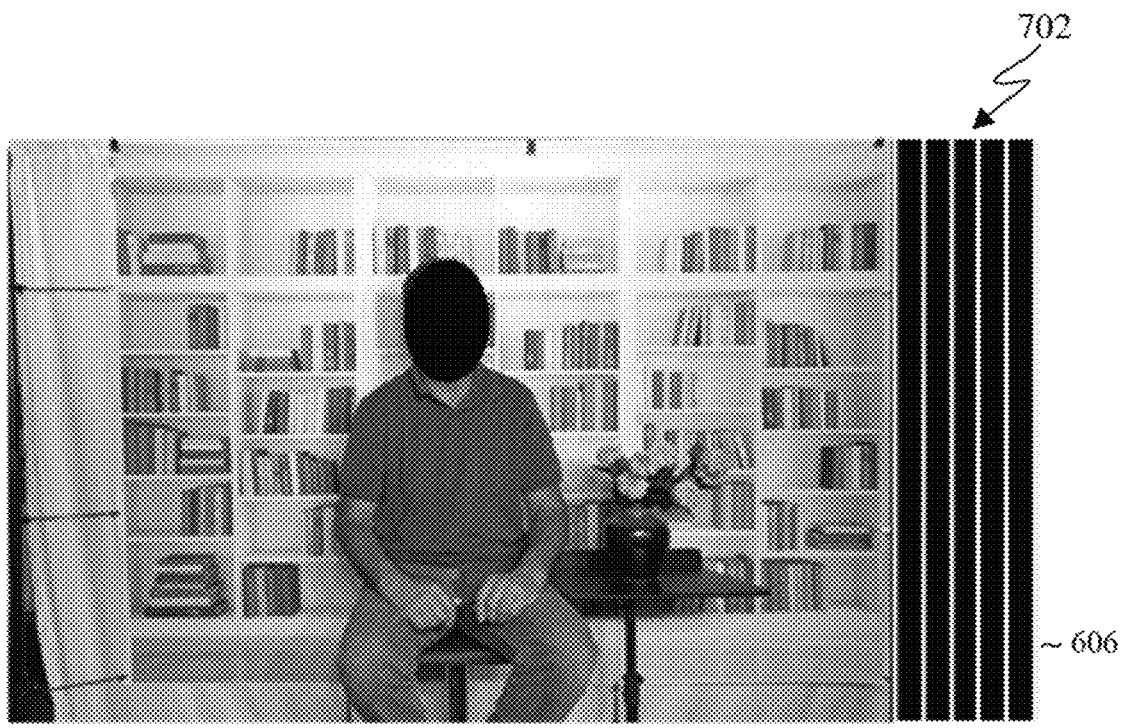
Figure 7C:
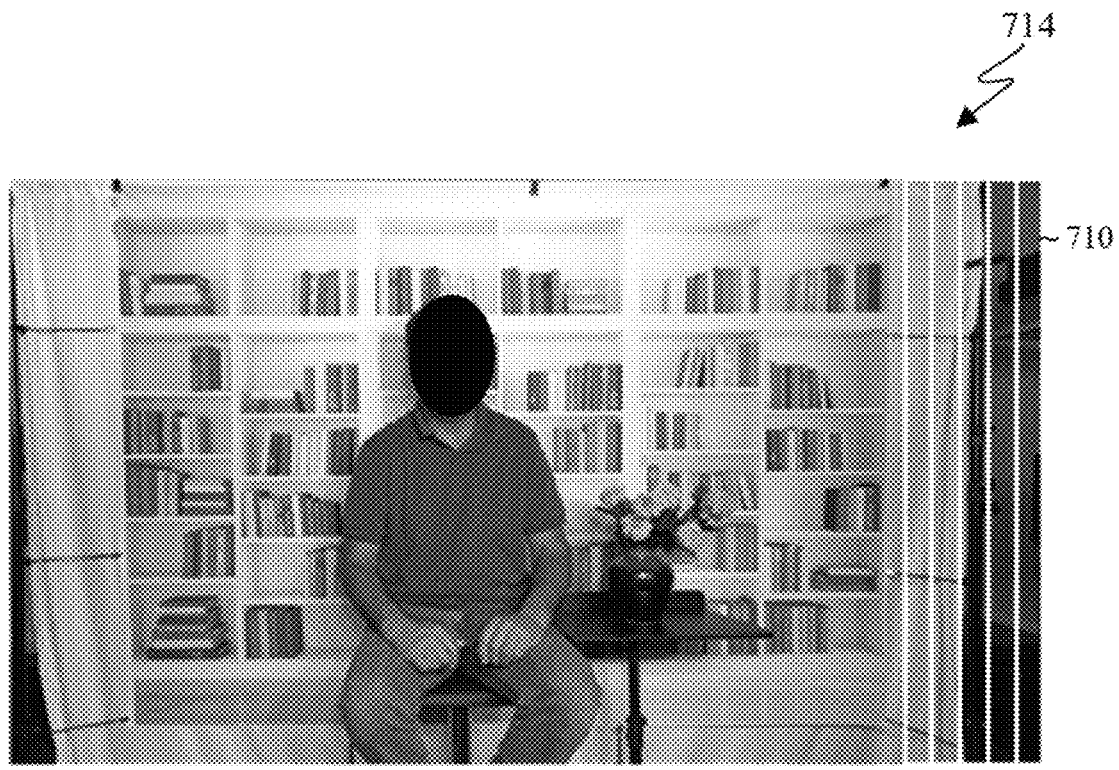
Figure 7D:
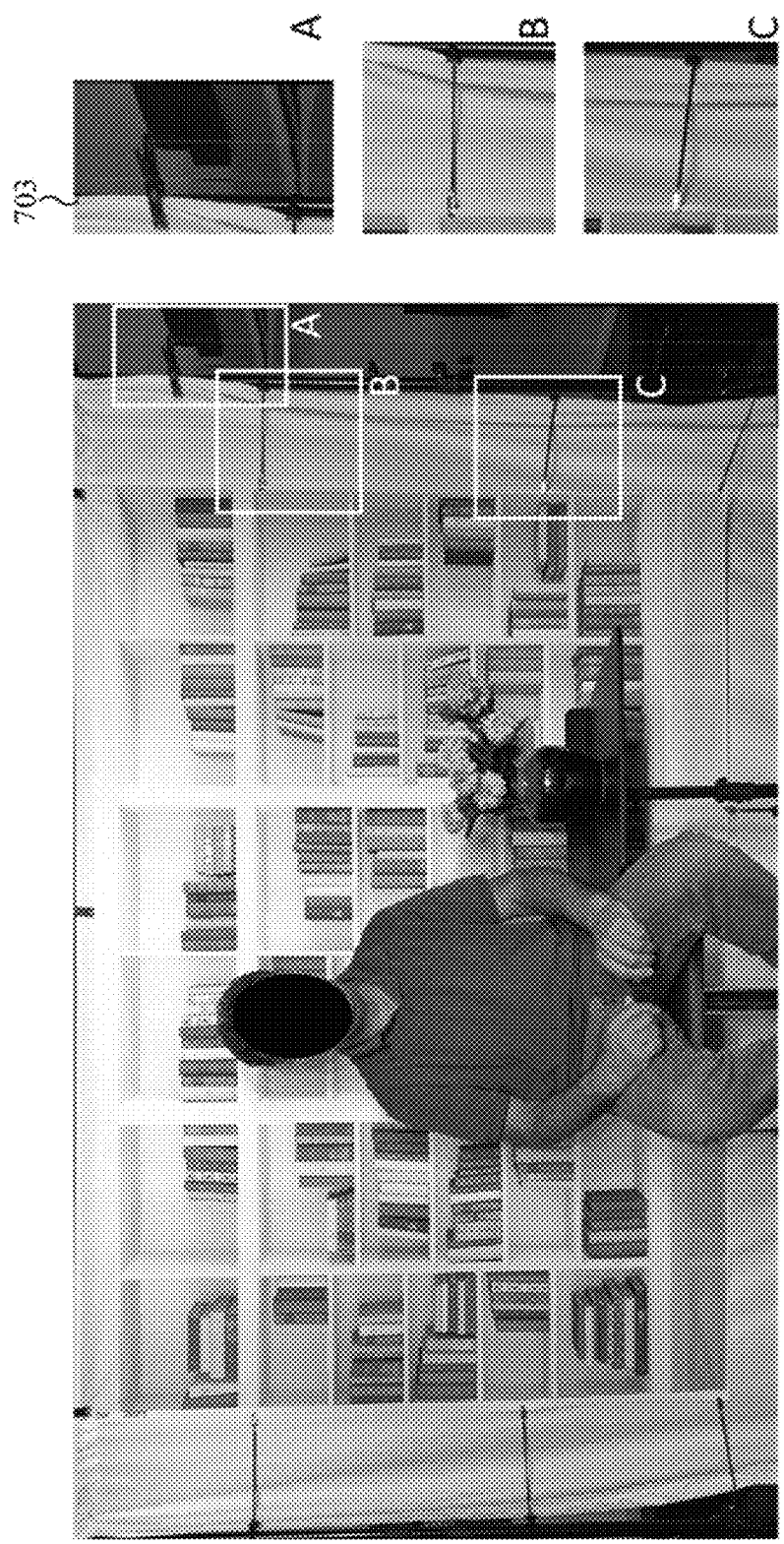

FIGS. 7A through 7D illustrate an example hierarchical FOV restoration in accordance with this disclosure. In particular, FIG. 7A illustrates a hierarchical restoration 700; FIG. 7B illustrates an example rectified and aligned frame 702 prior to hierarchical restoration 700; FIG. 7C illustrates an example restored frame 714; and FIG. 7D illustrates example discontinuities 703 at patch boundaries. The embodiment of the hierarchical FOV restoration 700 illustrated in FIGS. 7A through 7D are for illustration only. FIGS. 7A through 7D do not limit the scope of this disclosure to any particular implementation of an electronic device.

As shown in FIG. 7, a hierarchical FOV restoration 700 can be used to fill in the blank regions 606 for each of the frames 00-24. The hierarchical FOV restoration 700 performs restoration on each frame in order from the reference frame 610. However, the entire blank region 606 is patched from the adjacent frame. However, because each frame is processed in order, the patch include patches from each of the frames between a current frame and the reference frame (including the reference frame). A plurality of frames are captured by a plurality of cameras 704 in a camera array 402.

Each of the frames, except the reference frame, is rectified and aligned with the reference frame to generate a first frame 702a, a second frame 702b, a third frame 702c, etc. Rectifying and aligning the image frames (or video frames) occurs with respect to the reference view 610. For example, if the images are captured using a 1D linear rig wherein the calibration data is available, the images are first rectified using the intrinsic and extrinsic camera parameters. Then, the images may be aligned by identifying in each image the common features that originate from the selected plane of convergence in the scene and using the common features in the image pairs to find a geometric transformation matrix (such as a homography matrix). The estimated transformation matrices are then used to align the images to render them suitable for displaying via a 3D display. Following the alignment process, these common feature points (image points) that lie on the plane of convergence have the same pixel coordinates in each image. This step of rectification and alignment also generates the "blank" regions in the image, which leads to the net loss of FOV in the light field. The feature point is identified at a plane of convergence in the first frame and the second frame. A transformation matrix between the first frame and the second frame can be determined using the identified feature points. A size of the patch can be determined from translation components of the transformation matrix.

Each of the frames, after the rectification and alignment, includes a respective blank region 606. The first frame 702a has a first blank region 606a that is smaller than a second blank region 606b of the second frame 702b, which are both smaller than a third blank region 606c of the third frame 702c.

A first transform 706a is performed on the reference frame 610 to generate a first transformed frame 708a that has an orientation that corresponds to a first frame 702a from a second camera 704b. In other words, the first transform adjusts the reference frame 610 to have near-optimal superposition to the first frame 702a The first transform 706a adjusts the reference frame 610 between parameters of the first camera 704a to parameters of the second camera 704b. The first camera 704a is located at a center of the camera array 402 and the second camera 704b is located to a side of the first camera 704a. Whether the first camera 704a and the second camera 704b have parallel optical axis or asymmetrical frustum, the reference frame 610 and the first frame 702a have slightly different viewpoint angles. The first transform 706a is used to accommodate the difference between the viewing angle of the reference frame 610 and the viewing angle of the first frame 702a. A first patch region 710a is selected from the first transformed frame 708a that corresponds to the first blank region 606a in the first frame 702a. A first restoration function 712a is performed to insert the first patch region 710a from the first transformed frame 708a into the first blank region 606a of the first frame 702a to generate a first restored frame 714a.

A second transform 706b is performed on the first restored frame 714a to generate a second transformed frame 708b that corresponds to a second frame 702b from a third camera 704c. The second transform 706b adjusts the first restored frame 714a between parameters of the second camera 704b to parameters of the third camera 704c. The third camera 704c is located further from the center of the camera array 402 than the second camera 704b. Whether the second camera 704b and the third camera 704c have parallel optical axis or asymmetrical frustum, the first frame 702a and the second frame 702b have slightly different viewpoint angles. The second transform 706b is used to accommodate the difference between the viewing angle of the first frame 702a and the viewing angle of the second frame 702b. A second patch region 710b is selected from the second transformed frame 708b that corresponds to the second blank region 606b in the second frame 702b. A second restoration function 712b is performed to insert the second patch region 710b from the second transformed frame 708b into the second blank region 606b of the second frame 702b to generate a second restored frame 714b. Then, the patch may be added to the currently selected image as follows in TABLE 1.

TABLE 1

Pseudo code (following Python/Numpy array indexing convention) for copying and adding patch from the transformed reference (or just restored image) to the current selected image. This example assumes that images were captured using a 1D linear camera array.

h := height of the images in pixels (including the blank area),
w := width of the images in pixels (including the blank area).
from_image := the warped reference image (or just restored image) next to the current selected image. It is an array. The first two dimensions are the height (h) and width (w). The third dimension corresponds to the color channels.
to_image := the current selected image whose blank area is to be filled in. Like the from_image, it is also a three-dimensional array.
pw := patch width, derived from the translation component of the geometric transformation matrix used to align the images in Step ii. In this example, pw is the integer value of the horizontal translation component of the homography matrix estimated from the common feature points on the plane of convergence in the reference image and each of the selected images.
patch = from_image[: , w − pw : , :]
to_image[: , w − pw : , :] = patch A third transform 706c is performed on the second restored frame 714b to generate a third transformed frame 708c that corresponds to a third frame 702c from a fourth camera 704d. The third transform 706c adjusts the second restored frame 714b between parameters of the third camera 704c to parameters of the fourth camera 704d. The fourth camera 704d is located further from the center of the camera array 402 than the third camera 704c. Whether the third camera 704c and the fourth camera 704d have parallel optical axis or asymmetrical frustum, the second frame 702b and the third frame 702c have slightly different viewpoint angles. The third transform 706c is used to accommodate the difference between the viewing angle of the second frame 702b and the viewing angle of the third frame 702c. A third patch region 710c is selected from the third transformed frame 708c that corresponds to the third blank region 606c in the third frame 702c. A third restoration function 712c is performed to insert the third patch region 710c from the third transformed frame 708c into the third blank region 606c of the third frame 702c to generate a third restored frame 714c. This process can be extended for any amount of cameras in the camera array 402.

As shown in FIGS. 7B and 7C, the hierarchical restoration 700 can be performed for the recovery of the lost FOV of the blank region 606 in the frame 702. One or more patch region 710 can be copied and inserted into the corresponding blank regions 606.

In certain embodiments, the reference (or the just-restored FOV) image could be warped using a depth-based image warping technique such Depth-Image Based Rendering (DIBR) to render the reference image from the point-of-view of the selected image whose FOV is to be restored. If depth maps are available directly from one of the many depth sensing technologies such as LIDAR, stereo camera, structured-light sensing, etc., the depth maps may be directly used. Alternatively, the depth maps for each view may be estimated using stereo-based depth estimation techniques.

Some advantages of the hierarchical restoration are that the patches from the nearest viewpoint have a least amount of difference in perspectivity and occlusion relationship. The patches produce a least amount of dis-occlusion holes after warping, for depth-based warping. The patches also are closest in luminance. Therefore, the luminance discontinuity can be minimized at patch boundaries in the restored image 714.

As shown in FIG. 7D, despite the above advantages of the hierarchical FOV restoration method, luminance and other discontinuities may still appear at the patch boundaries. Furthermore, if depth-based warping is not employed for warping the reference (or the just restored images), depth-discontinuities may appear at the patch boundaries in the regions away from the plane of convergence. The plane of convergence in the example image was set very close to the plane passing the sitting person. The white vertical lines on the right side of the image shows the patch boundaries. Inset A show regions away from the plane of convergence, which exhibit depth-discontinuities at the patch boundaries. Insets B and C show regions very close to the plane of convergence, which exhibit no depth-discontinuities at the patch boundaries.

In certain embodiments, alpha blending can be used at the boundaries, while adding the patches to the images to restore the lost FOV, to create a smooth transition. Once the patch dimensions are determined, a mask ($M_P$) having a linear gradient (going from 0 to 1) section near the patch boundary followed by constant value of ones in the rest of the area is generated. The dimension of the mask matches the dimensions of the patch. The width of the gradient section may be changed in proportion to the degree of depth-discontinuities and the desired degree of smoothing. A complementary mask ($M_I$) may also be generated by subtracting $M_P$ from ones. Then, the patch may be added to the currently selected image as follows in equations 1 and 2.

$$\text{patch=from\_image}[:,w-pw:,:] \qquad \text{eq. 1}$$

$$\text{to\_image}[:,w-pw:,:]=M_I*\text{to\_image}[:,w-pw:,:]+ M_P*\text{patch} \qquad \text{eq. 2}$$

In certain embodiments, if the corresponding depth-maps are available, a variable amount of blurring may be applied to the patches based on the depth to reduce the effect of depth-discontinuities. All embodiments for reconstruction of lost FOV discussed in this disclosure employ automatic detection of the missing part of the FOV (i.e., the FOV lost in each view during rectification and alignment).

In certain embodiments, the dimensions and location of the missing part of the FOV in the rectified and aligned views may be determined using one of the two following methods depending on trading off between speed and complexity. A first method can determine a size of the blank region of the FOV from translation components of the geometric transformation matrix estimated using the feature points originating from the plane of convergence in the reference view and the corresponding features points in the target view whose FOV will be restored before alignment. A second method determines a size of the blank region of the FOV by comparing the target view against the previously FOV-restored (or the reference view) in the immediate neighborhood and finding the region of non-overlap in the target view. While the first method is simple and fast, it is not as accurate as the second, more complex method.

Although FIGS. 7A through 7D illustrate a hierarchical FOV restoration 700, various changes may be made to FIG. 7A through 7D. For example, the sizes, shapes, and dimensions of the individual components in hierarchical FOV restoration 700 can vary as needed or desired. Also, the number and placement of various components of the hierarchical FOV restoration 700 can vary as needed or desired. In addition, the hierarchical FOV restoration 700 may be used in any other suitable imaging process and is not limited to the specific processes described above.

Figure 8A:
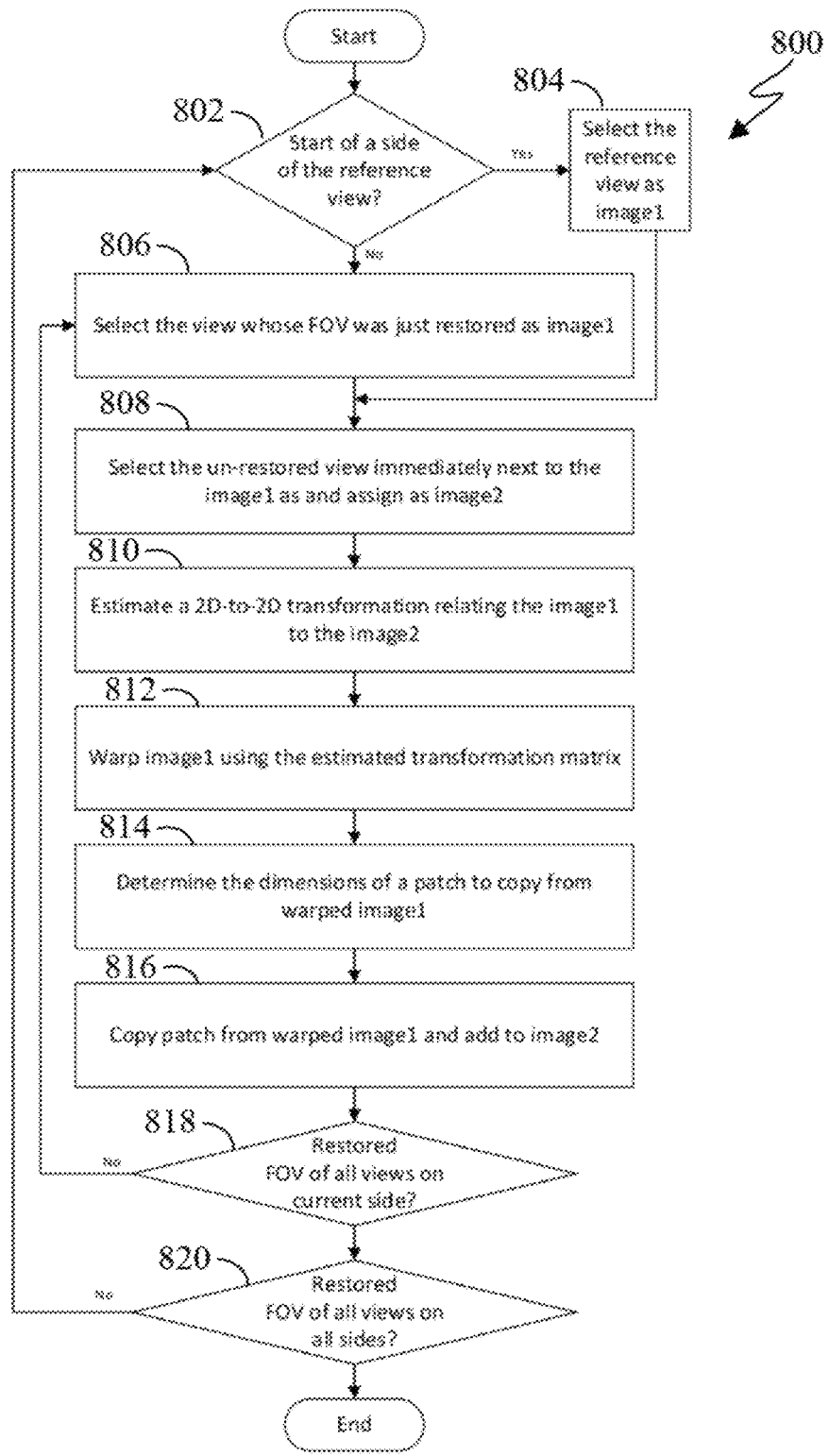
FIGS. 8A and 8B illustrate example methods for hierarchical FOV restoration according to this disclosure.
Figure 8B:
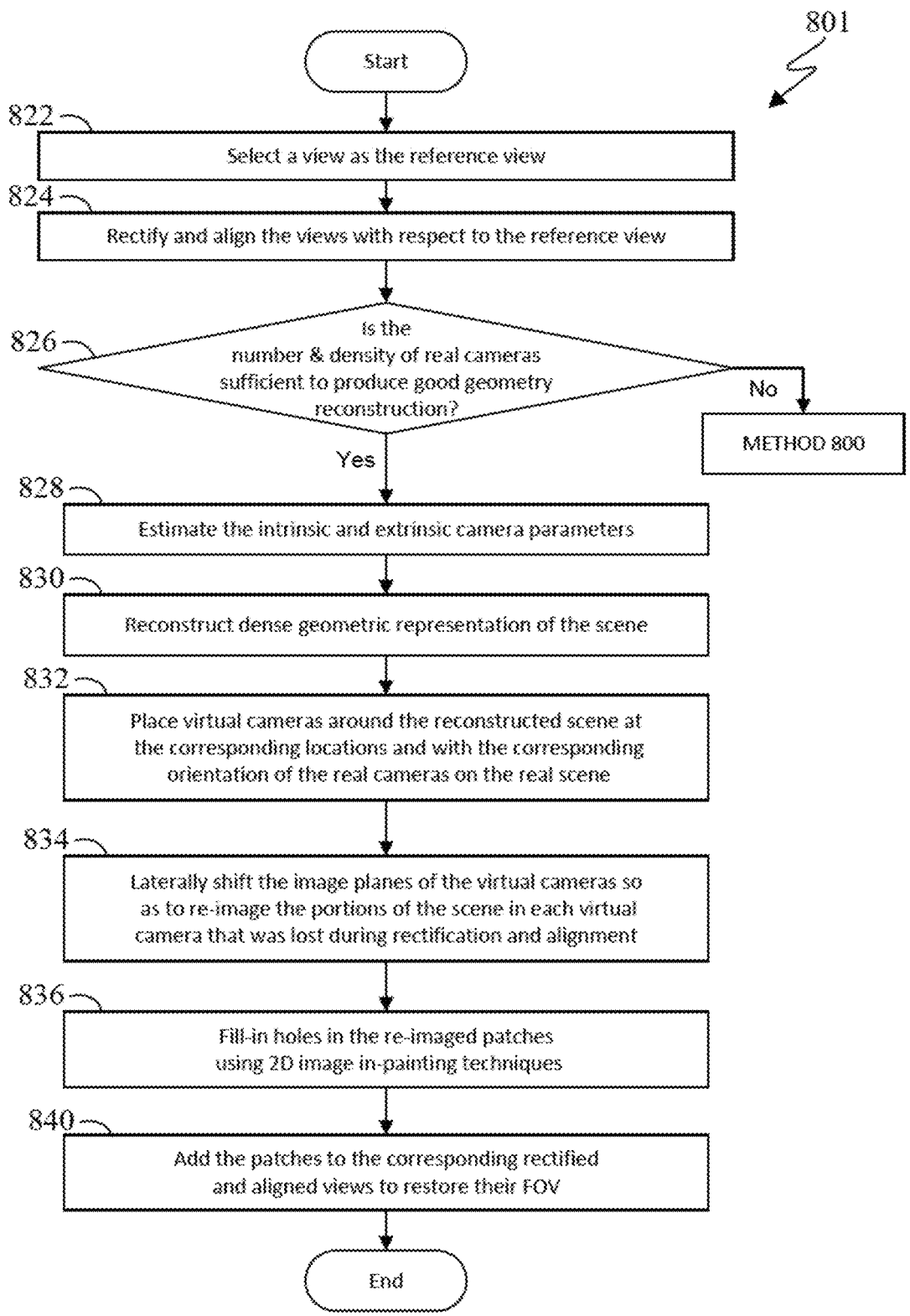

FIGS. 8A and 8B illustrate example methods for hierarchical FOV restoration according to this disclosure. In particular, FIG. 8A illustrates an example method 800 for hierarchical FOV restoration; and FIG. 8B illustrates an example method 801 for hierarchical FOV restoration. For ease of explanation, the methods 800, 801 of FIGS. 8A and 8B is described as being performed using the stereoscopic rendering processor 404 of FIG. 4. However, the methods 800, 801 may be used with any other suitable system and any other suitable processor. The method 800, 801 describe FOV restoration of an image array, such as image array 600, taken from camera array 402. The reference frame 610 is a frame corresponding to a camera 704a at a center of the camera array 402. The processor 404 progresses through the remaining frames of the camera array 402 in sequential order.

As shown in FIG. 8A, the processor 404 receives a frame and determines whether the frame is adjacent to the reference frame at step 802. "Receive" can refer to receiving wirelessly from a remote electronic device, received over a wired connection from an external electronic device, or loaded from a storage from a memory of the electronic device. The frames are received in order starting with the reference frame. As frames are captured in multiple directions from the reference frame, the processor 404 can determine a first direction to begin processing frames from the reference frame.

The processor 404 selects the reference frame as a first frame when determined in step 802 that the received frame is adjacent to the reference frame at step 804. As the frames are processed in order from the reference frame, the reference frame is the initial first frame chosen when FOV restoring a directly adjacent frame. The reference frame is selected as the first frame for steps 810-816.

The processor 404 selects the previous stereoscopic rendered frame as the first frame when determined in step 802 that the received frame is not adjacent to the reference frame at step 806. A received frame not directly adjacent to the reference frame means that at least one frame has been previously processed. The processor 404 determines a most recently processed frame, which is selected as the first frame for steps 810-816.

The processor 404 selects the received frame as the second frame at step 808. The un-restored view immediately next to the first image is assigned as a second image for steps 810-816. The received frame includes a blank region 606. The size of the blank region 606 increases in each frame moving sequentially away from the reference frame 610.

The blank region 606 is based on a difference between an area of the scene that is captured in the received frame or second frame from an area of the scene that is captured in the reference frame.

The processor 404 estimates a 2D-to-2D transformation matrix relating the first image to the second image at step 810. Due to the slightly different orientation of the first image and the second image, a 2D-to-2D transformation matrix is generated to transform the first frame to appear in a similar orientation as the second frame. In other words, the first frame is warped to have near-optimal superposition to the second frame. Example of the geometric transformations could include a homography transformation matrix or an affine transformation matrix that warps the reference image such that there is a near-optimal superposition (like a Procrustes superposition) between the warped reference image and the selected image in the overlapping regions. Note that the superposition will not be exact everywhere except for points near or at the plane of convergence due to the fundamental difference in perspective between the two images.

The processor 404 warps the first image using the estimated transformation matrix at step 812. The 2D-to-2D transformation matrix is applied to the first frame to generate a warped version of the first frame. The first frame in the series of frames is unaffected. That is, the warped version of the frame is temporarily stored. In certain embodiments, the 2D-to-2D transformation matrix can be applied to the area of the first frame that corresponds to an area of the blank region 606 in the second frame. In certain embodiments, the 2D-to-2D transformation matrix can be applied to an area of the first frame in a manner that the results in an area of the blank region 606 of the second frame. In other words, the warping can require an area outside of the area of the blank region 606 in order to properly warp the first frame.

The processor 404 determines the dimensions of a patch to copy from the warped first image at step 814. A size of the blank region 606 in the second frame can be determined as the dimensions for the patch from the first frame. The processor 404 can determine an area for the blank region 606 as a difference from an area of the scene captured in the second frame from an area of the scene captured in the reference frame. The dimension of the patch can be derived from the translation components of the said geometric transformation matrix used to align the images during rectification and alignment.

The processor 404 copies the patch from the warped first image and inserts or adds the patch to the second image at step 816. The processor 404 selects the patch based on the dimensions of the patch determined in step 814. The processor 404 inserts the patch from the first frame into the blank region of the second frame.

The processor 404 determines whether the FOV has been restored for all frames on a current side of the reference frame at step 818. As more than one frame is captured on each side of the reference frame, the processor 404 sequentially processes each of the frames in steps 810-816. When a frame is determined to exist subsequent to the second frame, the method 800 proceeds back to step 806. When the second frame is the final frame in a series of frame on a side of the reference frame, the method 800 proceeds to step 820. A pseudo-code for this step is provided above in TABLE 1 and equations 1 and 2.

The processor 404 determines whether the FOV has been restored on all sides of the reference frame at step 820. The processor 404 can determine whether a blank region has not been processed on a frame directly adjacent to the reference frame. If a blank region exists in a frame directly adjacent to the reference frame, the method 800 proceeds to back to step 802. If a blank region no longer exists in a frame directly adjacent to the reference frame, the FOV restoration is completed. The FOV can be restored on two side for a 1D camera array rig or on four sides for a 2D camera array rig.

As shown in FIG. 8B, the processor 404 can select a view as a reference view in step 822. The reference view can be a frame corresponding to a camera at a center of a camera array, a frame corresponding to a camera at an end of a camera array, or any other selection for a reference frame.

The processor 404 rectifies and aligns each of the frames from the cameras in the camera array with the selected reference frame in step 824. The FOV of each frame is determined based on an amount of a scene that is commonly captured by the respective frame compared to the reference frame. This produces a blank region in each of the frames other than the reference frame. As the reference frame would be compared to itself, the entirety of the scene captured by the reference frame is the FOV.

The processor 404 determines whether a number and density of real cameras is sufficient to produce suitable geometry results in step 826. When the processor 404 determines that the number and density of real cameras is not sufficient to produce suitable geometry results, the method 801 proceeds with the operation of method 800. When the processor 404 determines that the number and density of real cameras is sufficient to produce suitable geometry results, the method 801 proceeds to step 828.

The processor 404 estimates the intrinsic and extrinsic camera parameters in step 828. Example of parameters can include a height, orientation, etc., which can be different for each camera in the camera array.

The processor 404 reconstructs a dense geometric representation of the scene in step 830. The processor 404 can use the current frames to construct the dense geometric representation. The frames captured from the camera array can be used to build a point cloud or other 3D model.

The processor 404 can place virtual cameras around the reconstructed scene at corresponding locations and corresponding orientations of the real cameras at the scene in step 832. The processor 404 can laterally shift the image planes of the virtual cameras so as to re-image the portions of the scene in each virtual camera that was lost during rectification and alignment in step 834. The processor 404 can fill-in holes in the re-imagined patches using 2D image in-painting techniques in step 836. The processor 404 can add patches to the corresponding rectified and aligned views to restore the FOV in step 840.

Although FIGS. 8A and 8B illustrate example methods 800, 801 for hierarchical FOV restoration, various changes may be made to FIGS. 8A and 8B. For example, while shown as a series of steps, various steps in FIGS. 8A and 8B may overlap, occur in parallel, or occur any number of times.

Figure 9:
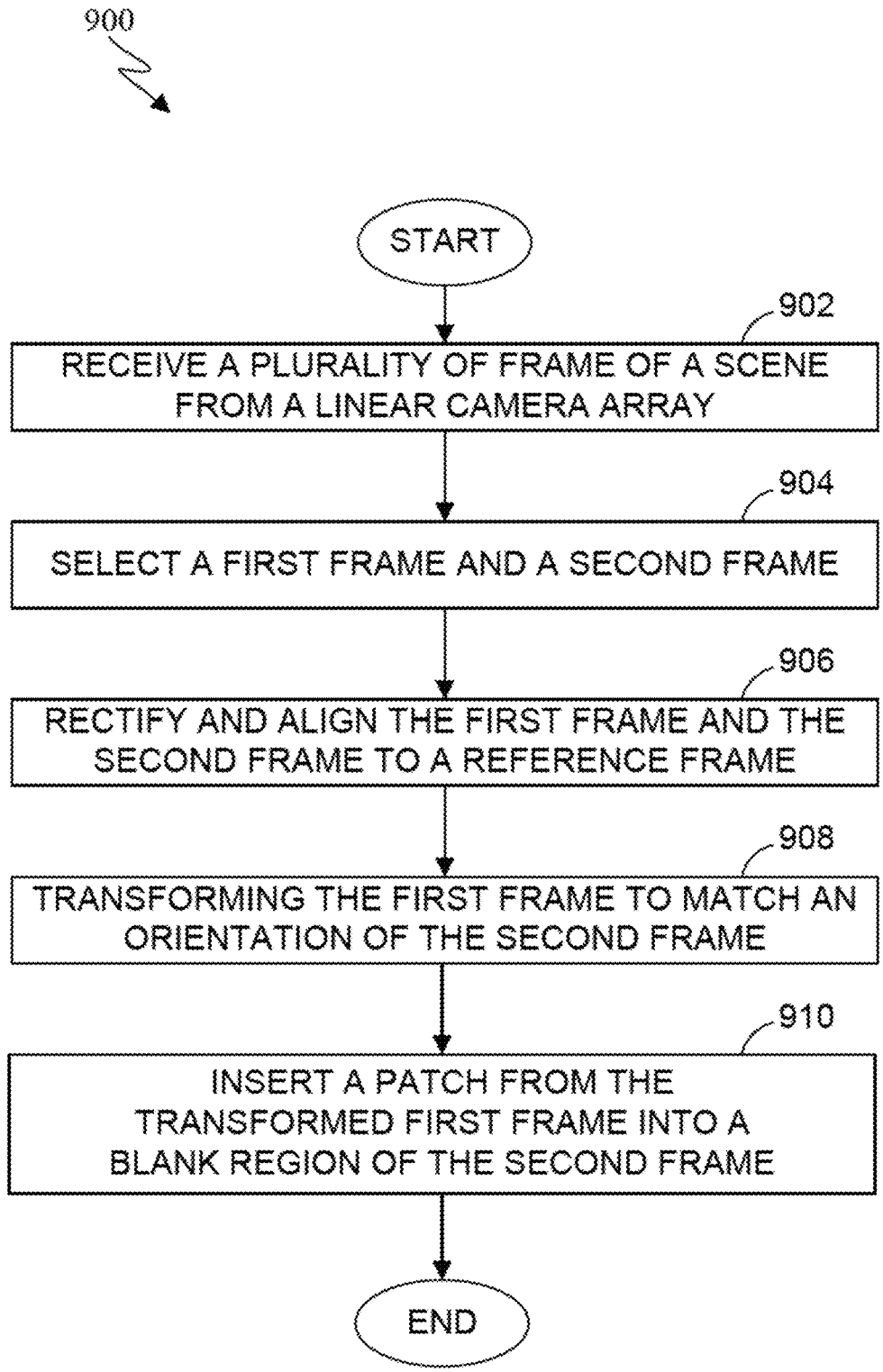
FIG. 9 illustrates an example method for restoring the FOV of images for stereoscopic rending captured via parallel camera setups according to this disclosure.

FIG. 9 illustrates an example method 900 for restoring the FOV of images for stereoscopic rending captured via parallel camera setups according to this disclosure. For ease of explanation, the method 900 of FIG. 9 is described as being performed using the processor 404 of FIG. 9. However, the method 900 may be used with any other suitable system and any other suitable processor.

As shown in FIG. 9, the processor 404 receives a plurality of frames of a scene capture from a linear camera array at step 902. "Receive" can refer to receiving wirelessly from a remote electronic device, received over a wired connection from an external electronic device, or loaded from a storage from a memory of the electronic device. The frames are received in sequential order starting with the reference frame. As frames are captured in multiple directions from the reference frame, the processor 404 can determine a first direction to begin processing frames from the reference frame.

The processor 404 selects a first frame and a second frame from the plurality of frames at step 904. The first frame can be a reference frame. The second frame can be directly adjacent to the first frame with respective to locations of the cameras in the linear camera array 402 that capture each of the first frame and the second frame.

The processor 404 rectifies and aligns the first frame and the second frame to a reference frame, where a blank region of the second frame has a greater area than a blank region of the first frame at step 906. The rectification and alignment for each of the first frame and second frame produces a frame with the original information of the first frame and the second frame, respectively, that is within a FOV of the reference frame. The resultant first frame and second frame can each have a blank region with different dimensions. When the first frame is the reference frame, the first frame may not have a blank region.

The processor 404 transforms the first frame to match an orientation of the second frame at step 908. The processor 404 can estimate a transformation matrix between the first frame and the second frame. The processor 404 can warp the first frame using the transformation matrix to an orientation of the second frame. The warping modifies the first frame to have near-optimal superposition to the second frame. The transformation matrix is applied to create a plane of convergence of zero-disparity plane at a specific depth in the scene.

The processor 404 inserts a patch from the transformed first frame into the blank region of the second frame at step 910. A size of the patch is determined based on the blank region of the second frame. Once the patch is inserted into the blank region of the second frame, the second frame is now restored to the FOV of the reference frame.

Steps 904-910 can be repeated for each frame in sequence from a reference frame, including a third frame. The steps 904-910 are also repeated for each from in sequence from a reference frame in a second direction of the linear camera array, including a fourth frame.

Although FIG. 9 illustrates one example of a method 900 for restoring the FOV of images for stereoscopic rending captured via parallel camera setups, various changes may be made to FIG. 9. For example, while shown as a series of steps, various steps in FIG. 9 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   at least one memory configured to receive a plurality of frames of a scene captured from a camera array; and
   at least one processor operably coupled to the at least one memory, the processor configured to:
   select a first frame and a second frame from the plurality of frames;
   rectify and align the first frame and the second frame to a reference frame, wherein a blank region of the first frame is a portion of the reference frame not captured in the first frame and a blank region of the second frame is a portion of the reference frame not captured in the second frame, wherein the blank region of the second frame has a greater area than the blank region of the first frame;
   transform the first frame to have near-optimal superposition to the second frame; and
   insert a patch from the transformed first frame into the blank region of the second frame.

2. The apparatus of claim 1, wherein the processor is further configured to:
   select a third frame from the plurality of frames,
   rectify and align the third frame to the reference frame, wherein a blank region of the third frame has a greater area than the blank region of the second frame,
   transform the second frame including the patch to have near-optimal superposition to the third frame, and
   insert a second patch from the transformed second frame and the transformed patch into the blank region of the third frame.

3. The apparatus of claim 1, wherein:
   the first frame is the reference frame at a center of the plurality of frames, and
   the processor is further configured to:
   select a fourth frame is on an opposite side of the first frame from the second frame,
   rectify and align the fourth frame to the reference frame, wherein a blank region of the fourth frame has a greater area than the blank region of the first frame,
   transform the first frame to have near-optimal superposition to the fourth frame, and
   insert a third patch from the transformed first frame into the blank region of the fourth frame.

4. The apparatus of claim 1, wherein, to transform the first frame to have near-optimal superposition to the second frame, the processor is further configured to:
   estimate a transformation matrix between the first frame and the second frame, and
   warp the first frame using the transformation matrix.

5. The apparatus of claim 1, wherein the first frame is a reference frame.

6. The apparatus of claim 1, wherein the processor is further configured to:
   determine a size of the patch from the transformed first frame by finding a region of non-overlap between the first frame and the second frame.

7. The apparatus of claim 1, wherein the processor is further configured to:
   identify feature points at a plane of convergence in the first frame and the second frame;
   determine a transformation matrix between the first frame and the second frame using the identified feature points; and
   determine a size of the patch from translation components of the transformation matrix.

8. A method comprising:
   receiving a plurality of frames of a scene captured from a camera array;
   selecting a first frame and a second frame from the plurality of frames;
   rectifying and aligning the first frame and the second frame to a reference frame, wherein a blank region of the first frame is a portion of the reference frame not captured in the first frame and a blank region of the second frame is a portion of the reference frame not captured in the second frame, wherein the blank region of the second frame has a greater area than the blank region of the first frame;

transforming the first frame to have near-optimal superposition to the second frame; and inserting a patch from the transformed first frame into the blank region of the second frame.

9. The method of claim 8, further comprising:

selecting a third frame from the plurality of frames;

rectifying and aligning the third frame to the reference frame, wherein a blank region of the third frame has a greater area than the blank region of the second frame;

transforming the second frame including the patch to have near-optimal superposition to the third frame; and inserting a second patch from the transformed second frame and the transformed patch into the blank region of the third frame.

10. The method of claim 8, wherein:

the first frame is the reference frame at a center of the plurality of frames, and the method further comprises:
  selecting a fourth frame is on an opposite side of the first frame from the second frame,
  rectifying and aligning the fourth frame to the reference frame, wherein a blank region of the fourth frame has a greater area than the blank region of the first frame;
  transforming the first frame to have near-optimal superposition to the fourth frame; and
  inserting a third patch from the transformed first frame into the blank region of the fourth frame.

11. The method of claim 8, wherein, to transform the first frame to have near-optimal superposition to the second frame, comprises:

estimating a transformation matrix between the first frame and the second frame, and warping the first frame using the transformation matrix.

12. The method of claim 8, wherein the first frame is a reference frame.

13. The method of claim 8, further comprising:

determining a size of the patch from the transformed first frame by finding a region of non-overlap between the first frame and the second frame.

14. The method of claim 8, further comprising:

identifying feature points at a plane of convergence in the first frame and the second frame;

determining a transformation matrix between the first frame and the second frame using the identified feature points; and determining a size of the patch from translation components of the transformation matrix.

15. A non-transitory computer readable medium containing instructions that when executed cause a processor to:

receive a plurality of frames of a scene captured from a camera array;

select a first frame and a second frame from the plurality of frames;

rectify and align the first frame and the second frame to a reference frame, wherein a blank region of the first frame is a portion of the reference frame not captured in the first frame and a blank region of the second frame is a portion of the reference frame not captured in the second frame, wherein the blank region of the second frame has a greater area than the blank region of the first frame;

transform the first frame to have near-optimal superposition to the second frame; and insert a patch from the transformed first frame into the blank region of the second frame.

16. The non-transitory computer readable medium of claim 15, wherein the instructions when executed further cause the processor to:

select a third frame from the plurality of frames, rectify and align the third frame to the reference frame, wherein a blank region of the third frame has a greater area than the blank region of the second frame, transform the second frame including the patch to have near-optimal superposition to the third frame, and insert a second patch from the transformed second frame and the transformed patch into the blank region of the third frame.

17. The non-transitory computer readable medium of claim 15, wherein:

the first frame is the reference frame at a center of the plurality of frames, and the instructions when executed further cause the processor to:
  select a fourth frame is on an opposite side of the first frame from the second frame,
  rectify and align the fourth frame to the reference frame, wherein a blank region of the fourth frame has a greater area than the blank region of the first frame,
  transform the first frame to have near-optimal superposition to the fourth frame, and
  insert a third patch from the transformed first frame into the blank region of the fourth frame.

18. The non-transitory computer readable medium of claim 15, the instructions that when executed cause the processor to transform the first frame to have near-optimal superposition to the second frame comprise instructions that when executed cause the processor to:

estimate a transformation matrix between the first frame and the second frame, and warp the first frame using the transformation matrix.

19. The non-transitory computer readable medium of claim 15, wherein the first frame is a reference frame.

20. The non-transitory computer readable medium of claim 15, wherein the instructions when executed further cause the processor to:

identify feature points at a plane of convergence in the first frame and the second frame;

determine a transformation matrix between the first frame and the second frame using the identified feature points; and determine a size of the patch from translation components of the transformation matrix.

* * * * *